(12) United States Patent
Kim et al.

(10) Patent No.: US 7,095,731 B2
(45) Date of Patent: Aug. 22, 2006

(54) MODIFIED BLOCK SPACE TIME TRANSMIT DIVERSITY ENCODER

(75) Inventors: Younglok Kim, Fort Lee, NJ (US); Ariela Zeira, Huntington, NY (US)

(73) Assignee: InterDigital Technology Corporation, Wilmington, DE (US)

(*) Notice: Subject to any disclaimer, the term of this patent is extended or adjusted under 35 U.S.C. 154(b) by 844 days.

(21) Appl. No.: 10/005,649

(22) Filed: Dec. 3, 2001

(65) Prior Publication Data

US 2002/0101845 A1 Aug. 1, 2002

Related U.S. Application Data

(60) Provisional application No. 60/255,098, filed on Dec. 13, 2000.

(51) Int. Cl.
*H04B 7/216* (2006.01)

(52) U.S. Cl. .................. 370/342; 370/335; 375/144

(58) Field of Classification Search ............ 370/335, 370/342, 441, 320, 326, 328, 347, 204; 375/346–348, 375/144, 146, 140, 260, 267
See application file for complete search history.

(56) References Cited

U.S. PATENT DOCUMENTS

| | | | | |
|---|---|---|---|---|
| 5,394,435 A | * | 2/1995 | Weerackody | 375/144 |
| 6,144,710 A | * | 11/2000 | Chen et al. | 375/346 |
| 6,317,411 B1 | * | 11/2001 | Whinnett et al. | 370/204 |
| 6,339,612 B1 | * | 1/2002 | Stewart et al. | 375/140 |
| 6,549,581 B1 | * | 4/2003 | Izumi | 375/260 |
| 6,775,260 B1 | * | 8/2004 | Dabak et al. | 370/342 |
| 6,804,206 B1 | * | 10/2004 | Moulsley | 370/320 |
| 2004/0052236 A1 | * | 3/2004 | Hwang et al. | 370/342 |

FOREIGN PATENT DOCUMENTS

| | | |
|---|---|---|
| EP | 767546 | 4/1997 |
| EP | 767546 A2 * | 4/1997 |
| EP | 0 993 129 | 4/2000 |
| EP | 0993129 | 4/2000 |
| EP | 1 069 707 | 1/2001 |
| EP | 1069707 | 1/2001 |
| WO | 01/05060 | 1/2001 |
| WO | 0105060 | 1/2001 |
| WO | 02/47278 | 6/2002 |

* cited by examiner

*Primary Examiner*—Chirag Shah
(74) *Attorney, Agent, or Firm*—Volpe & Koenig, P.C.

(57) ABSTRACT

The present invention is a system and method for transmitting data symbols in a CDMA communication system including a transmitter having an antenna array and a receiver. The system generates a first and second data field of symbols, then encodes them to produce complex conjugates of the respective symbols. A first communication burst including the first and second data fields, which are separated by a midamble, over a first antenna, and a second communication burst produced using said complex conjugates of said first and second data fields, which are separated by a midamble, over a second antenna are then transmitted by the transmitter. The receiver then receives and decodes the first and second communication bursts to recover the first and second data fields.

9 Claims, 3 Drawing Sheets

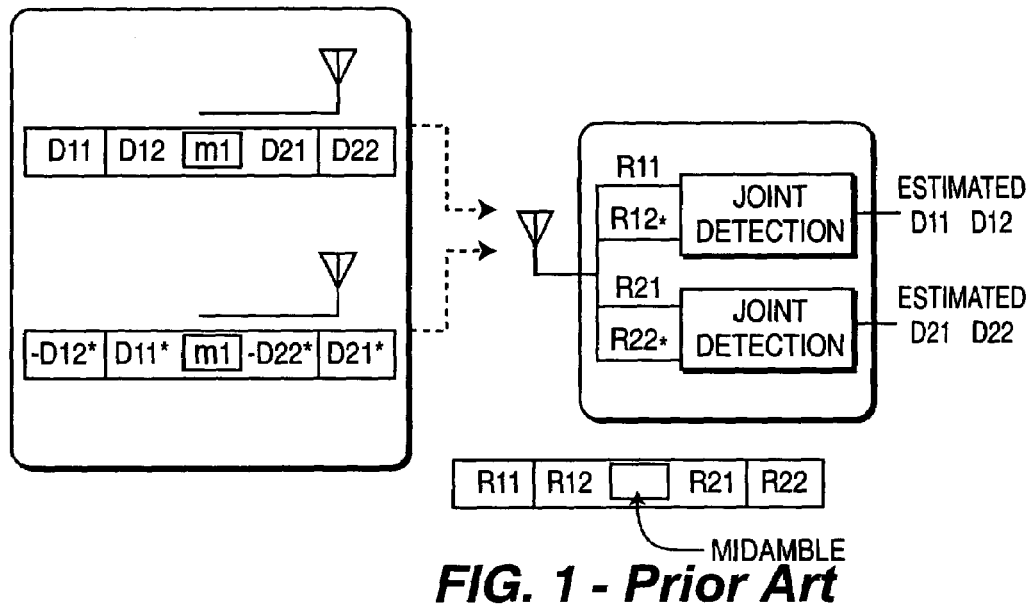
FIG. 1 - Prior Art
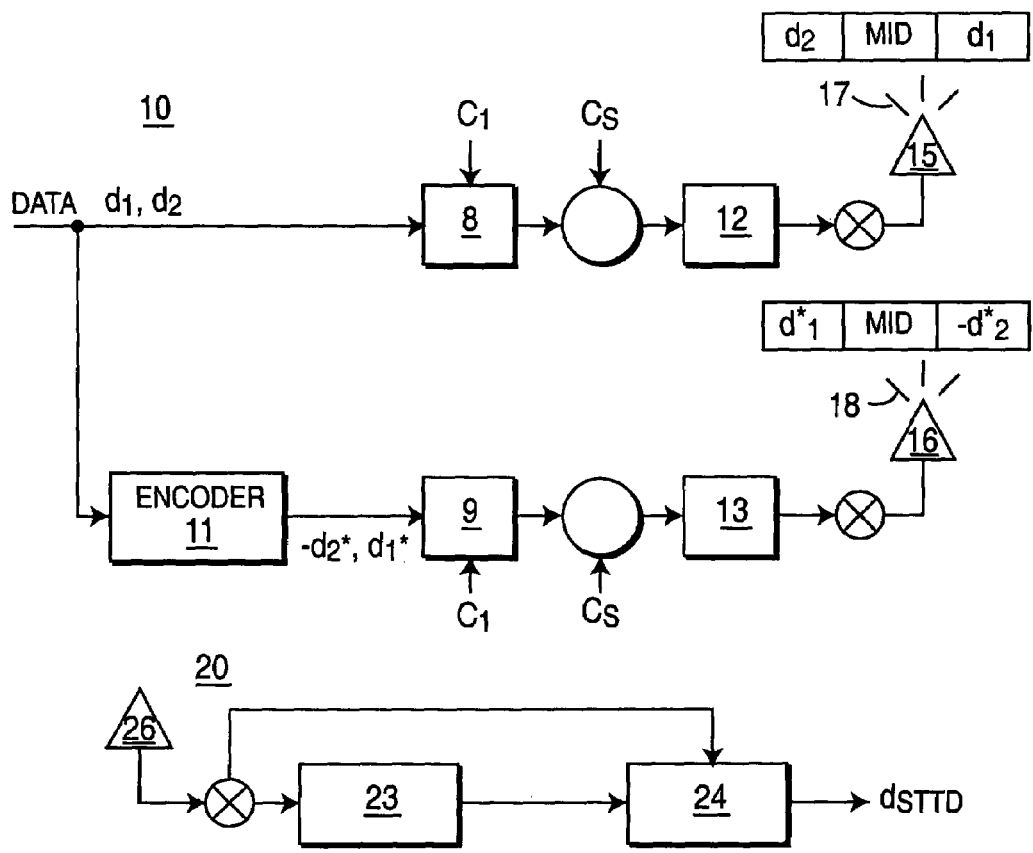
FIG. 2

MODIFIED BLOCK SPACE TIME TRANSMIT DIVERSITY ENCODER

CROSS REFERENCE TO RELATED APPLICATIONS

The application claims priority from Provisional Patent Application No. 60/255,098, filed Dec. 13, 2000.

BACKGROUND

The present invention relates to communications systems imploring code division multiple access (CDMA) techniques. More particularly, the present invention relates to a transmission diversity scheme which can be applied to a CDMA communication system.

Spacial diversity has been proposed for support of very high data rate users within third generation wide band code division multiple access systems. Using multiple antennas, the systems achieve better gains and link quality, which results in increased system capacity. Classically, diversity has been exploited through the use of either beam steering or through diversity combining.

More recently, it has been realized that coordinated use of diversity can be achieved through the use of space-time codes. Such systems can theoretically increase capacity by up to a factor equaling the number of transmit and receive antennas in the array. Space-time block codes operate on a block of input symbols producing a matrix output over antennas and time.

In the past, space-time transmit diversity systems have transmitted consecutive symbols simultaneously with their complex conjugates. This type of system, though may result in symbol overlap at the receiving end, with the amount of overlap being dependent on the length of the impulse response of the propagation channel. In time division duplex (TDD) mode, this symbol overlap will have to be accounted for in the joint detection receiver. The joint detector will have to estimate the transmitted symbols and their conjugates, resulting in an increase in complexity of the joint detection.

In order to alleviate this increase in joint detection, systems have been created which transmit two similar but different data fields. The first data field, having a first portion, $D_{11}$, and a second portion, $D_{12}$, is transmitted by the first antenna. A second data field is produced by modifying the first data field. The negation of the conjugate of $D_{12}$, $-D_{12}^*$, is the first portion of the second data field and the conjugate of $D_{11}$, $D_{11}^*$, is the second portion. The second data field is simultaneously transmitted by the second antenna. This type of system results in the joint detection implemented at the receiver needing only to estimate the same amount of symbols as in the case of a single transmit antenna. A block diagram of this system is illustrated in FIG. 1.

Neglecting the cross interference between the blocks the received signal model can be approximated as $$\begin{bmatrix} \vec{r_1} \\ \vec{r_2}^* \end{bmatrix} = \underbrace{\begin{bmatrix} A_{11} & -B_{11} \\ B_{22}^* & A_{22}^* \end{bmatrix}}_{E} \cdot \begin{bmatrix} \vec{d_1} \\ \vec{d_2}^* \end{bmatrix} + \begin{bmatrix} \vec{n_1} \\ \vec{n_2}^* \end{bmatrix} \quad \text{Equation 1}$$

where $$\vec{d_1} = [S_1, S_2, \cdots, S_{N/2}]^T$$

$$\vec{d_2} = [S_{N/2+1}, S_{N/2+2}, \cdots, S_N]^T$$

are the vector forms of the transmit symbol sequences. $A_{ij}$ and $B_{ij}$ are the sub-matrices of the banded propagation matrices A and B according to the channels from antenna 1 and 2 to a specific user respectively. They are rewritten by the following (2×2) block matrix representations:

$$A = \begin{bmatrix} A_{11} & O \\ A_{21} & A_{22} \end{bmatrix}, \quad B = \begin{bmatrix} B_{11} & O \\ B_{21} & B_{22} \end{bmatrix}.$$

Each column of the matrices A and B is the shifted versions of the convolution of the spreading code and the channel impulse response from the first and diversity antennas respectively.

The model of Equation 1 can be solved using a MMSE BLE by $$\begin{bmatrix} \vec{d}_{mmse1} \\ \vec{d}_{mmse2}^* \end{bmatrix} = D^{-1} \cdot E^H \begin{bmatrix} \vec{r_1} \\ \vec{r_2}^* \end{bmatrix}, \quad \text{with } D = E^H E + \sigma_n^2 I \quad \text{Equation 2}$$

where $\sigma_n^2$ is the variance of the additive white Gaussian noise. It can be simplified using the sub-block matrix manipulations and banded Toeplitz approximations.

The problem with the above-transmit diversity system is that the first and second portion, $D_{11}$, $D_{12}$ of the first data field requires the same number of symbols in each of the portions. Some TDD data fields include an odd number of symbols. Therefore, when the data field is split into two portions, the portions have a different number of symbols. A method to deal with this inequality must be implemented. One approach duplicates the first symbol to alleviate this problem. Other approaches are known in the art. Utilizing one of these methods results in additional computations for joint detection at the receiver. In particular, the first symbol is not STTD encoded, and hence the STTD encoder output becomes:

$$S_1, -(S_{(N+1)/2+1}, S_{(N+1)/2+2}, \ldots, S_N)^*, (S_2, S_3, \ldots, S_{(N+1)/2})^*$$

Furthermore, the initial approximation by eliminating the center elements of Equation 1 introduces a small error in the joint detection process.

Accordingly, there exists a need for other transmit diversity systems.

SUMMARY

The present invention is a system and method for transmitting data symbols in a CDMA communication system including a transmitter having an antenna array and a receiver. The system generates a first and second data field of symbols, then encodes them to produce complex conjugates of the respective symbols. A first communication burst including the first and second data fields, which are separated by a midamble, over a first antenna, and a second communication burst produced using said complex conjugates of said first and second data fields, which are separated by a midamble, over a second antenna are then transmitted by the transmitter. The receiver then receives and decodes the first and second communication bursts to recover the first and second data fields.

BRIEF DESCRIPTION OF THE DRAWINGS

FIG. 1 is a block diagram of a prior art communication system employing space-time transmit diversity.

FIG. 2 is a block diagram of a transmitter and receiver in a communication system in accordance with the preferred embodiment of the present invention.

DETAILED DESCRIPTION OF THE PREFERRED EMBODIMENTS

Figure 3:
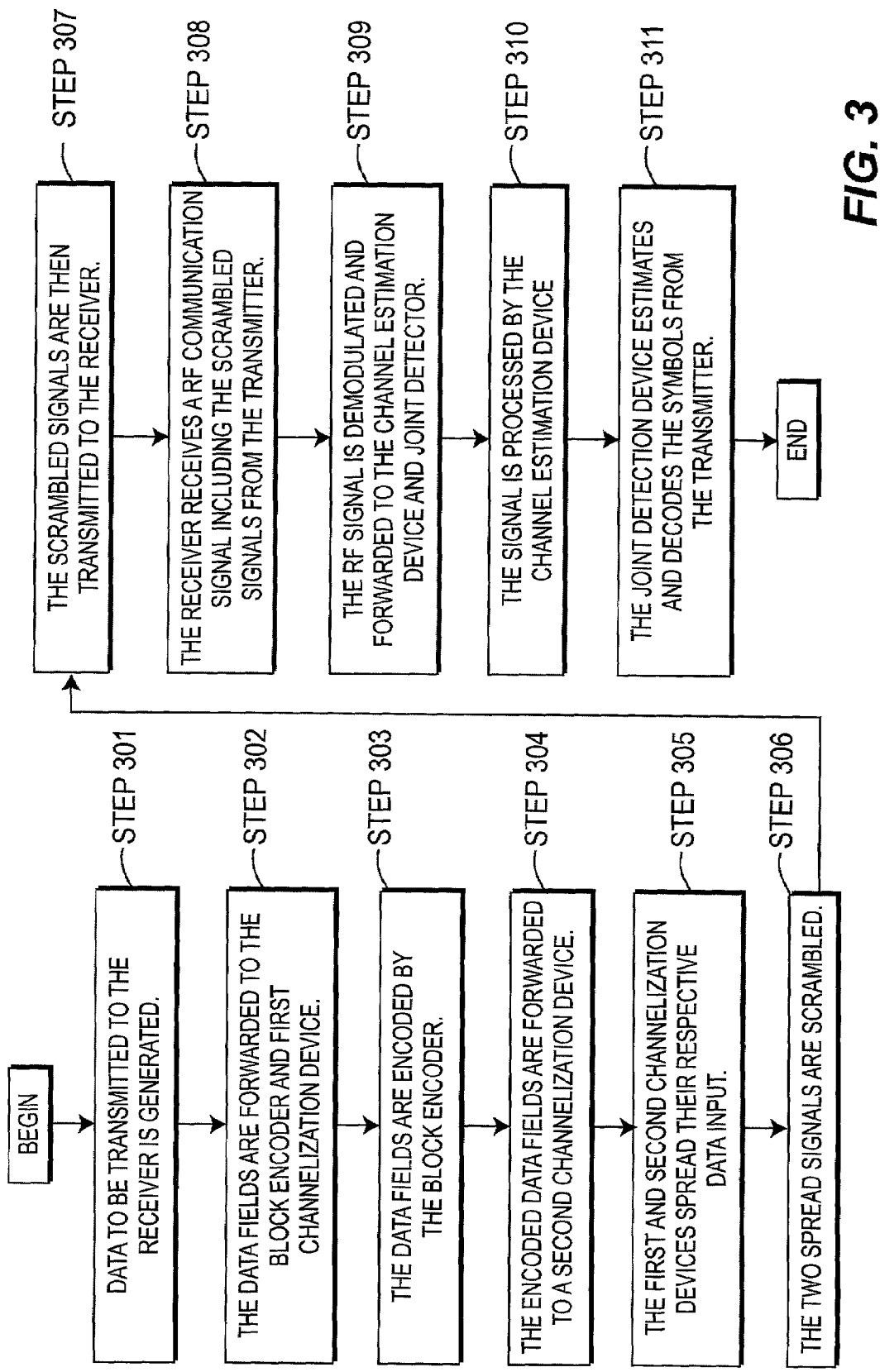
FIG. 3 is a flow diagram of the transmit diversity system of the present invention

FIG. 2 is a block diagram of a transmitter 10, preferably located at a base station, and a receiver 20, preferably located at a user equipment (UE), in a CDMA communication system in accordance with the preferred embodiment of the present invention. Although it is preferable to have the transmitter located at a base station and the receiver located at the UE, the receiver and transmitter may switch locations and the present invention operate on an uplink communication. The transmitter 10 comprises a block encoder 11, a plurality of channelization devices 8, 9, a plurality of spreading sequence insertion devices 12, 13, and a plurality of antennas 15, 16. Although FIG. 1 illustrates a transmitter comprising two (2) antennas, it should be apparent to those having skill in the art that more than two (2) antennas may be used, such as N antennas.

A typical communication burst has two data fields separated by a midamble sequence. Data to be transmitted by the transmitter 10 is produced by a data generator (not shown). The resulting data symbols $(S_{11}, S_{12}, \ldots S_{1x})$ of the first data field and $(S_{21}, S_{22}, \ldots S_{2x})$ of the second data field, represented as $d_1$ and $d_2$ respectively, are forwarded to the first channelization device 8 and the block encoder 11. Preferably, the block encoder 11 is a block space time transmit diversity (BSTTD) encoder. The bock encoder 11 encodes the input symbols of both data fields $d_1$, $d_2$ and generates the complex conjugate of $d_1$ and the negation of the complex conjugate of $d_2$: $d_1^*$, $-d_2^*$. The encoder 11 also changes the order of the data fields so that $-d_2^*$ is ahead of $d_1^*$.

Once the complex conjugates have been generated and the order changed, the encoder 11 forwards the two data fields $-d_2^*$, $d_1^*$ to a second channelization device 9. The first and second channelization devices 8, 9 spread their respective data fields using the same channelization code. The first channelization device spreading data fields $d_1$, $d_2$ and the second channelization device spreading data fields $-d_2^*$, $d_1^*$. The spread data fields from each of the channelization devices 8, 9 are then scrambled using a scrambling code associated with the transmitter 10.

After each spread data field is scrambled, they are forwarded to a first and second training sequence insertion device 12, 13, respectively. Spread data fields $d_1$, $d_2$ are forwarded to the first training sequence device 12 and spread data fields $-d_2^*$, $d_1^*$ are forwarded to the second training sequence device 13. The training sequence devices 12, 13 insert between the spread data fields associated with each respective sequence device 12, 13 a first and second midamble, respectively. The first midamble is associated with a first of the plurality of antennas 15 and the second midamble is associated with a second of the plurality of antennas 15. The insertion of the midamble between the spread data fields produces two communication bursts 17, 18, respectively. A typical communication burst 17 has the midamble, a guard period, and two data fields $d_1$, $d_2$, as shown in FIG. 2. The two bursts 17, 18 are modulated and simultaneously transmitted to the receiver 20 over antenna 15 and diversity antenna 16, respectively.

Referring back to FIG. 2, the receiver 20 comprises two joint detection devices (JD) 24, a BSTTD decoder 22, a channelization device 23, and an antenna 26. The antenna 26 of the UE receives various RF signals including the communication bursts 12, 18 from the transmitter 10. The RF signal are then demodulated to produce a baseband signal.

The baseband signal is then forwarded to the JD 24 and the channel estimation device 23. The channel estimation device 23 provides channel information, such as channel impulse responses, to the JD 24. The JD 24 are coupled to the channel estimation device 23 and the BSTTD decoder utilizes the channel information and the channelization codes to detect the data fields $d_1$, $d_2$, $-d_2^*$, $d_1^*$ of the transmitted communication bursts 17, 18 in the received signal. The exact received signal model in accordance with the preferred embodiment of the present invention can be represented by:

$$\begin{bmatrix} r_1 \\ r_2^* \end{bmatrix} = \begin{bmatrix} A & -B \\ B^* & A^* \end{bmatrix} \begin{bmatrix} d_1 \\ d_2^* \end{bmatrix} + \begin{bmatrix} n_1 \\ n_2^* \end{bmatrix} \qquad \text{Equation 3}$$

where $r_1$ and $r_2$ are the received signals, and $d_1$ and $d_2$ are the transmitted symbol sequence of the first and second data fields, respectively. As those skilled in the art know, A and B are the banded propagation matrices according to the channels from antennas 15 and 16. Since the d1 and d2 are bordered by the guard period and the midamble, which is typically cancelled, the middle terms of the within a data field encoding drop out. Accordingly, Equation 3 is not an approximation.

The JDs 24, 25 may use any type of data detection method and, preferably, which utilizes the above representation of the received signal. Preferably, a minimum means square encoder block linear equalizer (MMSE BLE) method is used for data detection. The MMSE BLE based data detection is written by $$\begin{bmatrix} d_{mmse1} \\ d_{mmse2}^* \end{bmatrix} = D^{-1} \begin{bmatrix} d_{wmf1} \\ d_{wmf2}^* \end{bmatrix} \qquad \text{Equation 4}$$

where $$D = E^H E + \sigma_n^2 I = \begin{bmatrix} D_{11} D_{21}^H \\ D_{21} D_{11}^* \end{bmatrix} \qquad \text{Equation 5}$$

with $$D_{11} = A^H A + (B^H B) * + \sigma_n^2 I$$
$$D_{21} = (B^H A)^T - B^H A$$

$(\cdot)^T$, $(\cdot)^H$ and $(\cdot)^*$ denote the transpose, complex conjugate transpose and complex conjugate functions, respectively. Using the cycle reduction for the Cholesky decomposition of the banded Toeplitz matrix together with some sub-matrix manipulation, the data fields $d_1$, $d_2$, $-d_2^*$, $d_1^*$ are estimated by the JD 24 using the block STTD BLE-JD algorithm, for example.

The flow diagram of the communication system the present invention is illustrated in FIG. 3. A data generator generates data to be transmitted to the receiver 20 (Step 301). The data fields $d_1$, $d_2$ are forwarded to the block encoder 11 and the first channelization device 8 (Step 302). The sub-data fields forwarded to the block encoder 11 are encoded (Step 303) and forwarded to the second channelization device 9 (Step 304). Each channelization device 8, 9 spreads their respective data field input using a channelization code (Step 305). The two spread signals are then scrambled, using the scrambling code associated with the transmitter 10 (Step 306) and transmitted to the receiver 20 over diversity antennas 15, 16 (Step 307).

The receiver 20 receives an RF communication signal including the two spread signals from the diversity antennas 15, 16 (Step 308), demodulates the signal and forwards the demodulated signal to the channel estimation device 23 and joint detection device 24 (Step 309). The received signal is processed by the channel estimation device 23 (Step 310) and the channel information is applied by the joint detection devices 24, 25 along with the channelization codes, to estimate and decode the transmit symbols from the diversity antennas 15, 16 (Step 311), yielding the data fields soft symbols.

Figure 4:
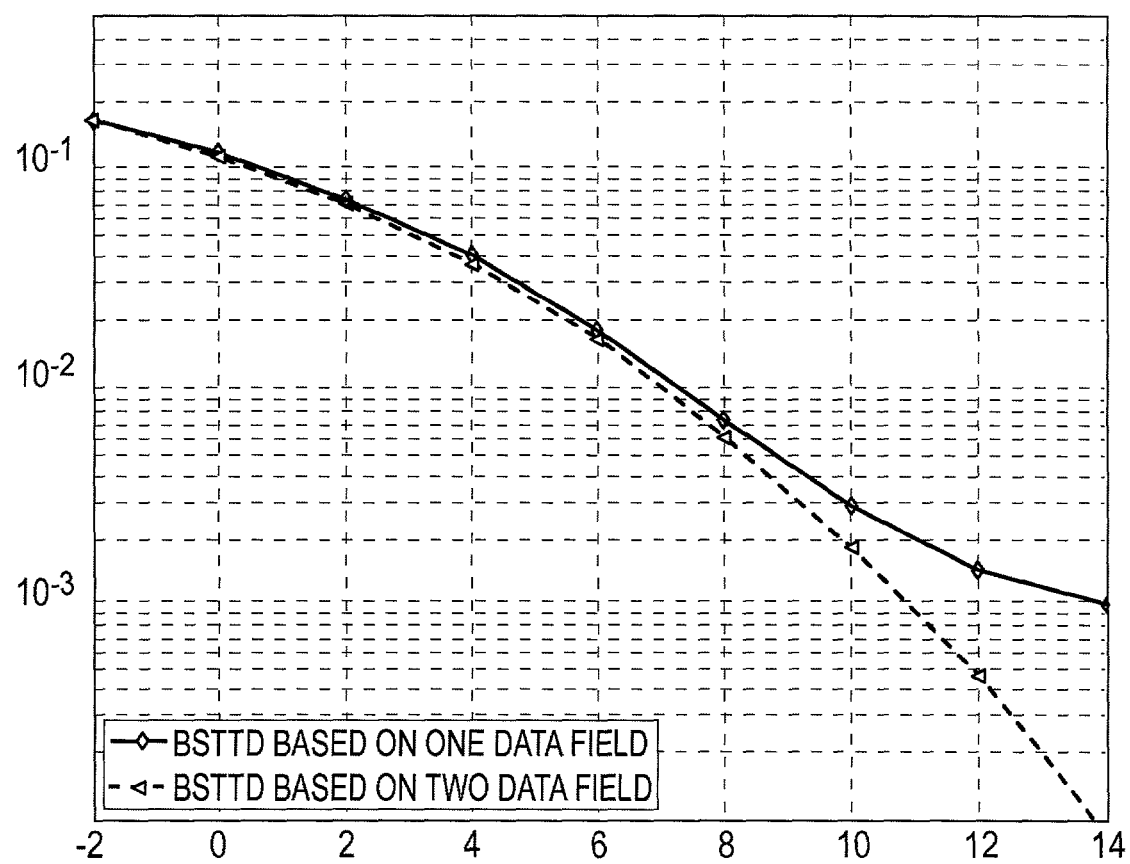
FIG. 4 is a graphical illustration of the performance of the present invention.

The system of the preferred embodiment provides an efficient method of transmitting data using block space time transmit diversity over a CDMA communication system. FIG. 4 is a graphical illustration of the performance of the system of the present invention, BSTTD based on two data fields, versus the conventional BSTTD based on one data field. The improved performance of the present invention is partly due to the fact that the interference between the two data fields is not introduced, due to the midamble and guard period separation between them. The present invention also eliminates the need for the receiver to compensate for the unequal data field portion encoding by using the first symbol twice or implementing some other method of compensation providing a less complex system when transmitting a data field with an odd number of symbols.

What is claimed is:

1. A method for transmitting data symbols in a CDMA communication system including a transmitter having an antenna array and a receiver, the method comprising the steps of:
    generating a first and second data field of symbols;
    encoding said first and second data field producing complex conjugates of the symbols of said first and second data field;
    transmitting from the said transmitter a first communication burst including said first and second data fields separated by a midamble over a first antenna and a second communication burst produced using said complex conjugates of said first and second data fields separated by a midamble over a second antenna;
    receiving and decoding at said receiver said first and second communication bursts to recover said first and second data fields, the decoding being performed after said first burst midamble and said second burst midamble are canceled;
    wherein said first communication burst comprises said first data field followed by said first burst midamble followed by said second data field followed by a first guard period; and
    said second communication burst comprises a negative complex conjugate of said second data field followed by said second burst midamble followed by a complex conjugate of said first data field followed by a second guard period.

2. The method of claim 1 wherein said encoding includes producing the negation of said complex conjugates of said second data field symbols.

3. The method of claim 1 wherein said receiving and decoding step comprises:
    estimating a channel response of said first and second communication bursts using said bursts' midambles; and
    detecting the symbols of said first and second communication bursts in response to said channel response.

4. The method of claim 3 wherein a base station includes said receiver and a user equipment includes said transmitter.

5. The method of claim 3 wherein a user equipment (UE) includes said receiver and a base station includes said transmitter.

6. A CDMA communication system including a base station and a user equipment (UE), comprising:
    an encoder which encodes a first and second data field of symbols to produce complex conjugates of the symbols of said first and second data fields;
    a first and second antenna of a transmitter which transmits RF signals including a first and second communication burst, wherein said first communication burst including said first and second data fields separated by a midamble is transmitted by said first antenna and said second communication burst produced using said complex conjugates of said first and second data fields separated by a midamble is transmitted by said second antenna;
    a receiver comprising a decoder which decodes said RF signals to recover said first and second data fields, the decoding being performed after said first burst midamble and said second burst midamble are canceled;
    a first burst generator, associated with said first antenna, which generates said first communication burst including said first data field followed by said first burst midamble followed by said second data field followed by a first guard period; and
    a second burst generator, associated with said second antenna, which generates said second communication burst including said negated complex conjugate of said second data field followed by said second burst midamble followed by said complex conjugate of said first data field followed by a second guard period.

7. The system of claim 6 wherein said encoder negates said complex conjugate of said second data field.

8. The system of claim 6 wherein said base station includes said receiver and said UE includes said transmitter.

9. The system of claim 6 wherein said UE includes said receiver and said base station includes said receiver.

* * * * *

UNITED STATES PATENT AND TRADEMARK OFFICE
CERTIFICATE OF CORRECTION

| | |
|---|---|
| PATENT NO. | : 7,095,731 B2 |
| APPLICATION NO. | : 10/005649 |
| DATED | : August 22, 2006 |
| INVENTOR(S) | : Kim et al. |

It is certified that error appears in the above-identified patent and that said Letters Patent is hereby corrected as shown below:

At column 3, line 14, after the word "invention", insert --.--.

At column 3, lines 54-59, delete "The first … transmitter 10." and replace with --The first channelization device (8) spreading data fields $d_1$, $d_2$ and the second channelizatin device (9) spreading data fields $d_2^*$, $d_1^*$ are then scrambled using a scrambling code associated with transmitter 10.--.

At column 4, line 16, before the word "are", delete "signal" and insert therefor --signals--.

At column 5, line 4, after the word "system", insert --of--.

Signed and Sealed this

First Day of May, 2007

JON W. DUDAS
*Director of the United States Patent and Trademark Office*